United States Patent
Lee et al.

(10) Patent No.: US 8,345,777 B2
(45) Date of Patent: Jan. 1, 2013

(54) DEBLOCKING FILTERING APPARATUS AND METHOD

(75) Inventors: Yung-lyul Lee, Seoul (KR); Sung-chang Lim, Seoul (KR); Jae-ho Hur, Paju-si (KR)

(73) Assignees: Samsung Electronics Co., Ltd., Suwon-si (KR); Industry-Academia Cooperation Group of Sejong University, Seoul (KR)

( * ) Notice: Subject to any disclaimer, the term of this patent is extended or adjusted under 35 U.S.C. 154(b) by 1441 days.

(21) Appl. No.: 11/943,780

(22) Filed: Nov. 21, 2007

(65) Prior Publication Data

US 2008/0117981 A1    May 22, 2008

Related U.S. Application Data

(60) Provisional application No. 60/860,499, filed on Nov. 22, 2006.

(30) Foreign Application Priority Data

Feb. 14, 2007  (KR) .................. 10-2007-0015532

(51) Int. Cl.
*H04N 7/12* (2006.01)
(52) U.S. Cl. ................................... 375/240.29
(58) Field of Classification Search .............. None
See application file for complete search history.

(56) References Cited

U.S. PATENT DOCUMENTS

| | | | |
|---|---|---|---|
| 7,050,504 B2 * | 5/2006 | Joch et al. | 375/240.26 |
| 2004/0071210 A1 | 4/2004 | Amara et al. | |
| 2004/0179620 A1 * | 9/2004 | Foo et al. | 375/240.27 |
| 2005/0276505 A1 * | 12/2005 | Raveendran | 382/268 |
| 2006/0002477 A1 | 1/2006 | Bae | |
| 2006/0133504 A1 | 6/2006 | Jung et al. | |
| 2006/0181740 A1 | 8/2006 | Kim et al. | |
| 2007/0177674 A1 * | 8/2007 | Yang | 375/240.25 |
| 2007/0253479 A1 * | 11/2007 | Mukherjee | 375/240.1 |
| 2009/0052529 A1 * | 2/2009 | Kim et al. | 375/240.12 |
| 2009/0257669 A1 * | 10/2009 | Kim et al. | 382/238 |
| 2010/0027653 A1 * | 2/2010 | Jeon et al. | 375/240.12 |

FOREIGN PATENT DOCUMENTS

| | | |
|---|---|---|
| EP | 1246131 A2 | 10/2002 |
| EP | 1677545 A2 | 7/2006 |
| EP | 1933566 A2 | 6/2008 |
| KR | 10-2005-0076836 A | 7/2005 |

OTHER PUBLICATIONS

Communication dated May 24, 2011 from the European Patent Office in counterpart European application No. 07834151.8.

(Continued)

*Primary Examiner* — Chirag Shah
*Assistant Examiner* — Jenkey Van
(74) *Attorney, Agent, or Firm* — Sughrue Mion, PLLC

(57) ABSTRACT

Provided is an image deblocking filtering method and apparatus. The method includes: determining whether at least one of two adjacent blocks is encoded using illumination compensation, adjusting a filtering intensity of a deblocking filter based on the determination, and deblocking filtering the two adjacent blocks based on the adjusted filtering intensity.

16 Claims, 9 Drawing Sheets

OTHER PUBLICATIONS

Park et al. "MVC Deblocking for Illumination Compensation." ITU Study Group 16—Video Coding Experts Group—ISO/IEC MPEG & ITU-T VCEG (ISO/IEC JTC1/SC29/WG11 and ITU-T SG16 Q6), XX, XX, No. JVT-V033, Jan. 2007, XP030006841, pp. 1-22.

Shim et al. "Deblocking filter on illumination compensation." ITU Study Group 16—Video Coding Experts Group—ISO/IEC MPEG & ITU-T VCEG (ISO/IEC JTC1/SC29/WG11 and ITU-T SG16 Q6), XX, XX, No. JVT-V051, Jan. 2007, XP030006859, pp. 1-9.

"Description of Core Experiments in MVC." ITU Study Group 16—Video Coding Experts Group—ISO/IEC MPEG & ITU-T VCEG (ISO/IEC JTC1/SC29/WG11 and ITU-T SG16 Q6), XX, XX, No. N8019, Apr. 2006, XP030014511, pp. 1-38.

* cited by examiner

DEBLOCKING FILTERING APPARATUS AND METHOD

This application claims the priority of U.S. Provisional Patent Application No. 60/860,499, filed on Nov. 22, 2006, in the U.S. Patent and Trademark Office, and Korean Patent Application No. 10-2007-0015532, filed on Feb. 14, 2007, in the Korean Intellectual Property Office, the disclosures of which are incorporated herein in their entirety by reference.

BACKGROUND OF THE INVENTION

1. Field of the Invention

The present invention relates to a method and apparatus for deblocking filtering an image, and more particularly, to a method and apparatus for deblocking filtering an image including an encoded block using illumination compensation.

2. Description of the Related Art

In order to encode an image, image compression methods such as MPEG (Moving Picture Expert Group)-1, MPEG-2, MPEG-4, H.264, and MPEG-4 AVC (advanced video coding) divide a picture into a plurality of macroblocks and encode each macroblock using inter prediction or intra prediction.

These image compression methods encode the image into macroblocks, causing blocking artifacts in the restored image. Blocks are discrete cosine transformed and quantized irrespective of correlations between adjacent blocks or pixels, which causes damage to the original image, leading to blocking artifacts.

A deblocking filter reduces this block boundary error and improves the quality of the restored image. This will be described in detail with reference to FIGS. 1A, 1B, and 2.

FIGS. 1A and 1B are block diagrams of conventional image encoding and decoding apparatuses, respectively. These apparatuses perform inter prediction and encode an image, and decode the inter predicted image based on the H.264 standards.

Referring to FIG. 1A, a motion estimator 110 generates a motion vector of a current block that is to be encoded according to reference picture(s) stored in a frame memory 122. A motion compensator 112 generates a prediction block that is a predicted value of the original current block based on the motion vector generated by the motion estimator 110. The motion compensator 112 subtracts the prediction block from the original current block and generates a residue. A discrete cosine transform (DCT) & quantization unit 114 discrete cosine transforms the residue and quantizes the residue. An entropy encoder 116 variable length encodes the quantized residue. The residue encoded by the entropy encoder 116 and the motion vector generated by the motion estimator 110 are inserted into a bit stream and transmitted.

An inverse quantization & inverse DCT unit 118 inverse quantizes and inverse discrete cosine transforms the quantized residue, in order to use the residue to restore the encoded picture.

The residue is added to the prediction block and stored in the frame memory 122 after being deblocking filtered in a deblocking unit 120. If the residue is not deblocking filtered, blocking artifacts occur. A conventional image decoding apparatus will be described with reference to FIG. 1B.

Referring to FIG. 1B, a motion compensator 128 generates a prediction block of an original current block based on data of a motion vector included in a bit stream, by searching a reference picture stored in a frame memory 132.

An entropy decoder 124 receives and entropy decodes the encoded residue. An inverse quantization & inverse DCT unit 126 inverse quantizes and inverse discrete cosine transforms the residue entropy decoded by the entropy decoder 124. The restored residue is added to the prediction block generated by the motion compensator 128 and restored to a block that is not encoded. In the same manner as encoding the image, a deblocking unit 130 deblocking filters the residue to prevent blocking artifacts in the restored block, and stores the residue in the frame memory 132.

FIG. 2 is a flowchart illustrating a conventional deblocking filtering method. The deblocking filtering method performed by the deblocking unit 120 or 130 is defined by the H.264 standards.

Referring to FIG. 2, the deblocking unit 120 or 130 determines whether at least one of two adjacent blocks p and q that are to be deblocking filtered is intra encoded (Operation 201).

In particular, if the deblocking unit 120 or 130 determines that at least one of two adjacent blocks p and q is intra encoded in Operation 201, the deblocking unit 120 or 130 determines whether the two adjacent blocks p and q that are to be deblocking filtered are located at a macroblock boundary (Operation 202). If the deblocking unit 120 or 130 determines that the two adjacent blocks p and q are located at the macroblock boundary in Operation 202, the deblocking unit 120 or 130 sets a filtering intensity of a deblocking filter to the maximum boundary strength (Bs)=4, and deblocking filters the two adjacent blocks p and q (Operation 206). If the two adjacent blocks p and q are not located at the macroblock boundary, the deblocking unit 120 or 130 sets the filtering intensity to Bs=3, and deblocking filters the two adjacent blocks p and q (Operation 207).

If the deblocking unit 120 or 130 determines that the two adjacent blocks p and q are not intra encoded in Operation 201, the deblocking unit 120 or 130 determines whether at least one of the two adjacent blocks p and q has an orthogonal transform coefficient, i.e. a DCT coefficient (Operation 203). If the deblocking unit 120 or 130 determines that at least one of the two adjacent blocks p and q has an orthogonal transform coefficient in Operation 203, the deblocking unit 120 or 130 sets the filtering intensity to Bs=2, and deblocking filters the two adjacent blocks p and q (Operation 208). If the deblocking unit 120 or 130 determines that the two adjacent blocks p and q do not have an orthogonal transform coefficient in Operation 203, Operation 204 is performed.

If the two adjacent blocks p and q do not have an orthogonal transform coefficient in Operation 203, the deblocking unit 120 or 130 determines whether reference frames of the two adjacent blocks p and q differ from each other or the numbers of reference frames of the two adjacent blocks p and q differ from each other, in Operation 204. If the reference frames or the numbers of reference frames differ from each other in Operation 204, the deblocking unit 120 or 130 sets the filtering intensity to Bs=1, and deblocking filters the two adjacent blocks p and q (Operation 209).

If the reference frames or the numbers of reference frames of the two adjacent blocks p and q are identical to each other in Operation 204, the deblocking unit 120 or 130 determines whether motion vectors of the two adjacent blocks p and q differ from each other (Operation 205). If the deblocking unit 120 or 130 determines that the motion vectors of the two adjacent blocks p and q differ from each other in Operation 205, Operation 209 is performed. If the deblocking unit 120 or 130 determines that the motion vectors of the two adjacent blocks p and q do not differ from each other in Operation 205, the deblocking unit 120 or 130 sets the filtering intensity to Bs=0, and does not deblocking filter the two adjacent blocks p and q (Operation 210).

The conventional deblocking filtering method as described in Operations 201 through 210 does not consider encoding of the two adjacent blocks p and q using illumination compensation, which causes blocking artifacts, since a DC value of the current block changes according to whether the two adjacent blocks p and q are encoded using illumination compensation.

Therefore, a method and apparatus for deblocking filtering an image using illumination compensation are needed.

SUMMARY OF THE INVENTION

The present invention provides a method and apparatus for deblocking filtering an image.

The present invention also provides a computer readable medium on which the method is recorded.

According to one aspect of the present invention, there is provided an image deblocking filtering method comprising: determining whether at least one of two adjacent blocks is encoded using illumination compensation; adjusting a filtering intensity of a deblocking filter based on the determination; and deblocking filtering the two adjacent blocks based on the adjusted filtering intensity.

The determining may comprise: if the at least one of the two adjacent blocks are encoded using illumination compensation, comparing an absolute value of a difference between difference value of illumination changes (DVICs) of the two adjacent blocks with a first threshold value.

The deblocking filtering of the two adjacent blocks may comprise: applying different filtering intensities depending on whether the absolute value is greater or less than the first threshold value.

The determining may further comprise: if only one of the two adjacent blocks is encoded using illumination compensation, comparing the absolute value of a difference value of illumination change (DVIC) of the block that is encoded using illumination compensation with the first threshold value.

According to another aspect of the present invention, there is provided an image deblocking filtering apparatus comprising: a controller determining whether at least one of two adjacent blocks is encoded using illumination compensation; and a filtering unit adjusting a filtering intensity of a deblocking filter based on the determination by the controller and deblocking filtering the two adjacent blocks based on the adjusted filtering intensity.

The two adjacent blocks may be included in different macroblocks.

If the at least one of the two adjacent blocks are encoded using illumination compensation, the controller may compare the absolute value of the difference between difference value of illumination changes (DVICs) of the two adjacent blocks with a first threshold value and a second threshold value that is less than the first threshold value.

If only one of the two adjacent blocks is encoded using illumination compensation, the controller may compare the absolute value of a difference value of illumination change (DVIC) of the block that is encoded using illumination compensation with the first threshold value and the second threshold value.

According to another aspect of the present invention, there is provided a computer readable recording medium storing a program for executing the image deblocking filtering method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described in detail by explaining exemplary embodiments of the invention with reference to the attached drawings.

Figure 3A:
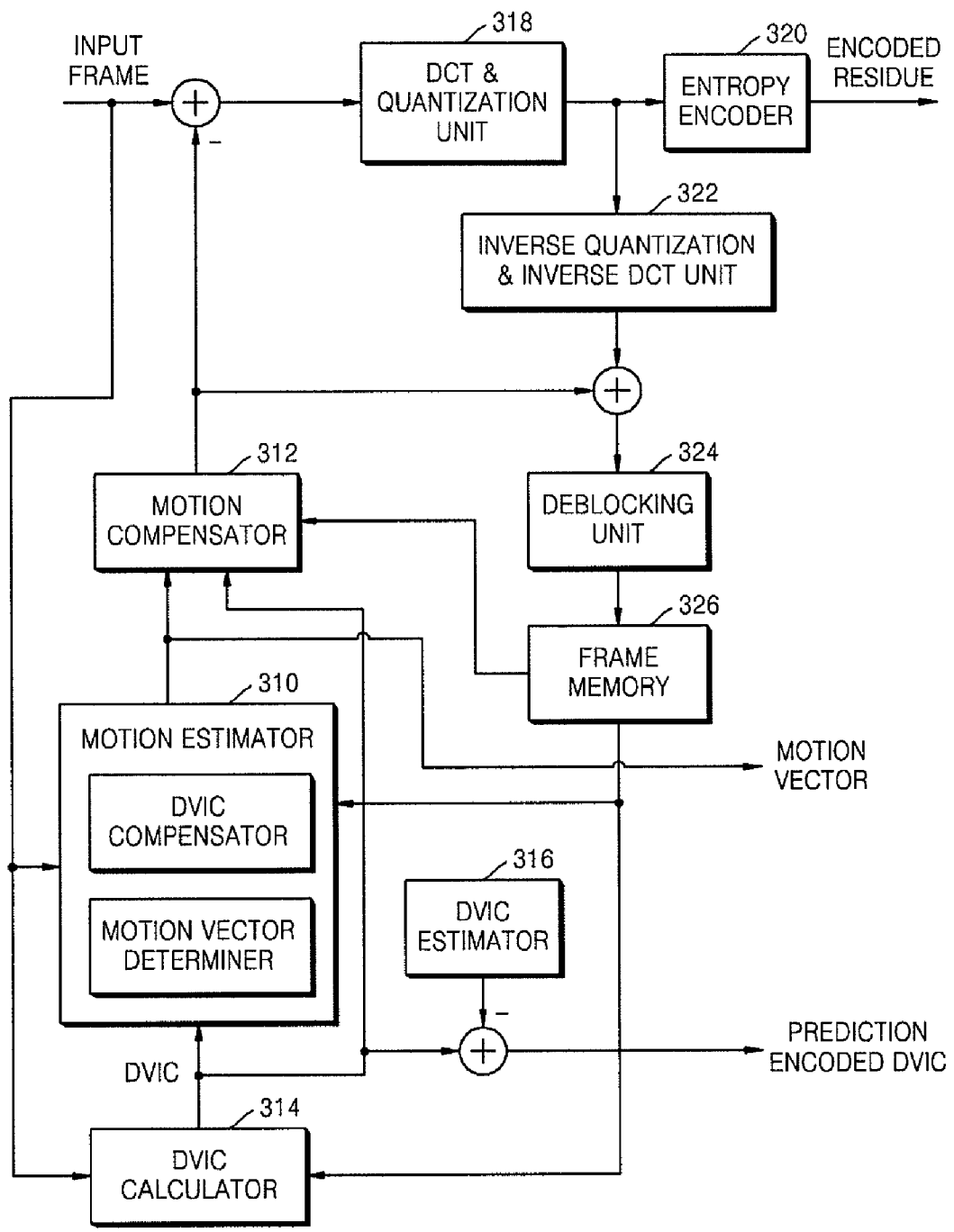
FIGS. 3A and 3B are block diagrams of image encoding and decoding apparatuses, respectively, according to an exemplary embodiment of the present invention.
Figure 3B:
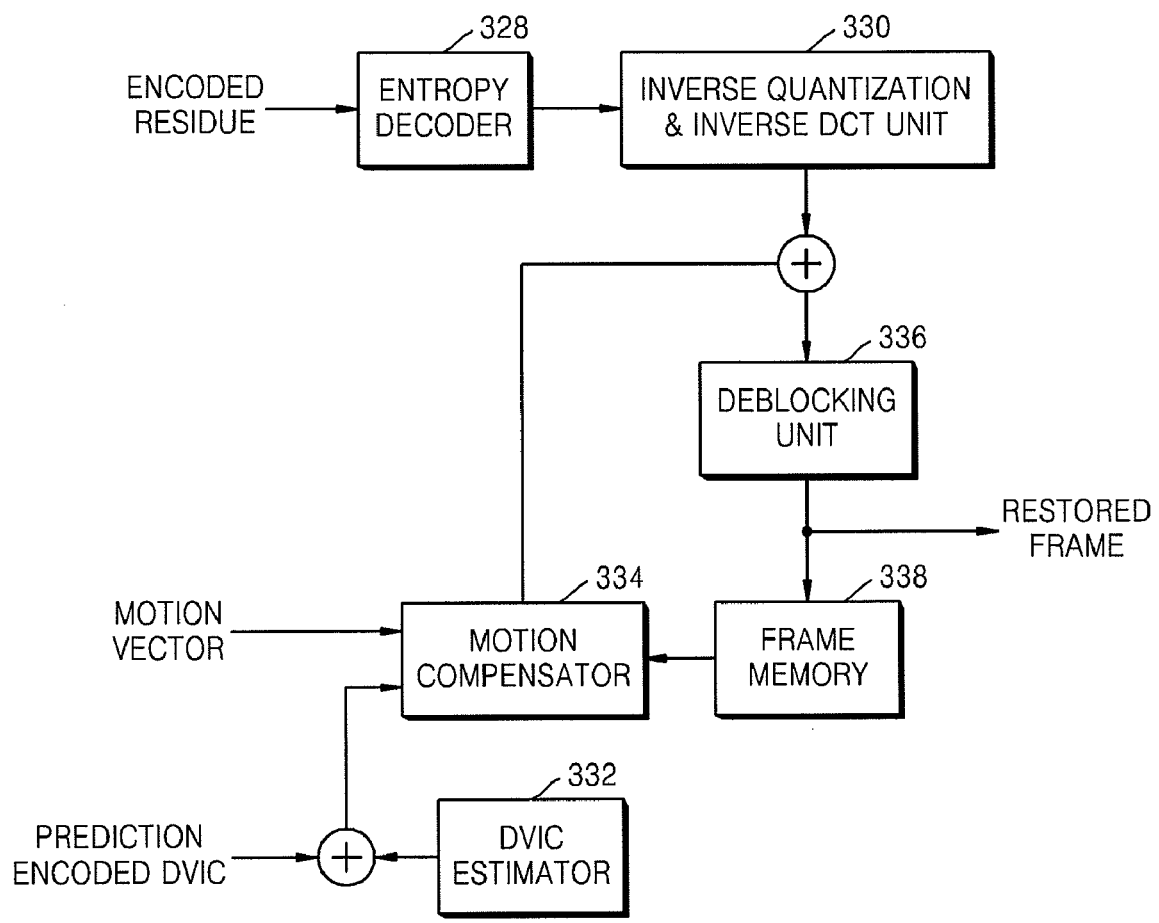

FIGS. 3A and 3B are block diagrams of image encoding and decoding apparatuses, respectively, according to an exemplary embodiment of the present invention. Illumination compensation is used to perform inter prediction and encode an image, and to decode the inter predicted image.

Referring to FIG. 3A, the image encoding apparatus of the present embodiment includes a motion estimator 310, a motion compensator 312, a difference value of illumination change (DVIC) calculator 314, a DVIC estimator 316, a discrete cosine transform (DCT) & quantization unit 318, an entropy encoder 320, an inverse quantization & inverse DCT unit 322, a deblocking unit 324, and a frame memory 326. The deblocking unit 324 corresponds to a deblocking filtering apparatus according to the present invention.

The DVIC calculator 314 differentiates a DC value of a current block that is to be encoded and a DC value of a reference block that is to be used to inter-predict the current block, and calculates a DVIC.

The DC values of the current block and the reference block may be calculated by macroblocks, differentiating the DC values of the corresponding macroblocks, and calculating the DVIC. The DVIC estimator 316 estimates a DVIC of blocks adjacent to the current block. The DVIC calculator 314 subtracts the DVIC estimated by the DVIC estimator 316 from the DVIC calculated by the DVIC calculator 314, and inserts the subtracted DVIC into a bit stream, thereby increasing the image compression.

The motion estimator 310 estimates a motion vector of the current block based on the DVIC calculated by the DVIC calculator 314. The motion estimator 310 illumination compensates the current block based on the DVIC calculated by the DVIC calculator 314, searches for a reference picture stored in the frame memory 326 according to the current block that is illumination compensated, and estimates the motion vector of the current block. The motion vector of current block estimated by the motion estimator 310 is inserted into the bit stream and transmitted to the image decoding apparatus.

The motion compensator 312 motion compensates the current block according to the DC value of the current block, the DC value of the reference block, and the motion vector using Equation 1.

$$NewR(i, j) = \{f(i, j) - M_{cur}(m, n)\} - \frac{(r(i+x', j+y') - M_{ref}(m+x', n+y'))}{}  \quad 1)$$

$$= \{f(i, j) - r(i+x', j+y')\} - \frac{\{M_{cur}(m, n) - M_{ref}(m+x', n+y')\}}{}$$

wherein NewR(i,j) denotes a residue at a coordinate (i,j) generated by the illumination compensation, f(i,j) denotes the pixel value at the coordinate (i,j) of a current frame, r(i+x', j+y') denotes the pixel value at a coordinate (i+x', j+y') of the reference picture, $M_{cur}$(m,n) denotes a pixel of DC value of the current block, $M_{ref}$(m+x',n+y') denotes a pixel of DC value of the reference block, and (x', y') denotes the motion vector of the current frame.

The DCT & quantization unit 318 discrete cosine transforms the residue, orthogonal transforms the residue to a frequency region, and quantizes the residue. The entropy encoder 320 variable length encodes the quantized residue and inserts the variable length encoded residue into the bit stream.

The inverse quantization & inverse DCT unit 322 inverse quantizes and inverse discrete cosine transforms the residue, thereby restoring the residue to its state before the entropy encoding. The restored residue is added to the prediction block of the current block generated by the motion compensator 312 and restored to the block before the entropy encoding.

To use the restored block as the reference picture, the restored block is stored in the frame memory 326 after being deblocking filtered in the deblocking unit 324 in order to remove blocking artifacts. Since the conventional deblocking filtering does not consider illumination compensation, blocking artifacts cannot be completely removed. Therefore, an improved deblocking filtering method is needed to remove blocking artifacts, which will be described in detail with reference to FIGS. 4 through 6.

Referring to FIG. 3B, the image decoding apparatus inter-predicts the image using the illumination compensation and decodes the encoded image. The image decoding apparatus of the present embodiment includes an entropy decoder 328, an inverse quantization & inverse DCT unit 330, a DVIC estimator 332, a motion compensator 334, a deblocking unit 336, and a frame memory 338. The deblocking unit 336 corresponds to a deblocking filtering apparatus according to the present invention.

The entropy decoder 328 entropy decodes data of the variable length encoded residue of the current block included in the bit stream. The inverse quantization & inverse DCT unit 330 inverse quantizes and inverse discrete cosine transforms the data, and restores the residue. The restored residue is added to a prediction block generated by the motion compensator 334 and restored to the current block.

The motion compensator 334 corresponds to the motion compensator 312 of the image encoding apparatus shown in FIG. 3A. The motion compensator 334 uses the DVIC of the current block to generate the prediction block of the current block. The DVIC estimator 332 estimates a DVIC of blocks adjacent to the current block. The DVIC estimated by the DVIC estimator 332 is added to the DVIC that is prediction encoded and included in the bit stream, to generate a DVIC of the current block.

The motion vector included in the bit stream is used to search for a reference picture stored in the frame memory 338, generate a reference block, add the DVIC to a DC value of the reference block, thereby generating a DC value of the current block. The DC value of the current block and the reference block are used to generate the prediction block of the current block.

The prediction block generated by the motion compensator 334 is added to the residue, thereby restoring the current block. To use the restored block as the reference picture, the restored block is stored in the frame memory 338 after being deblocking filtered in the deblocking unit 336 in order to remove blocking artifacts.

Figure 4:
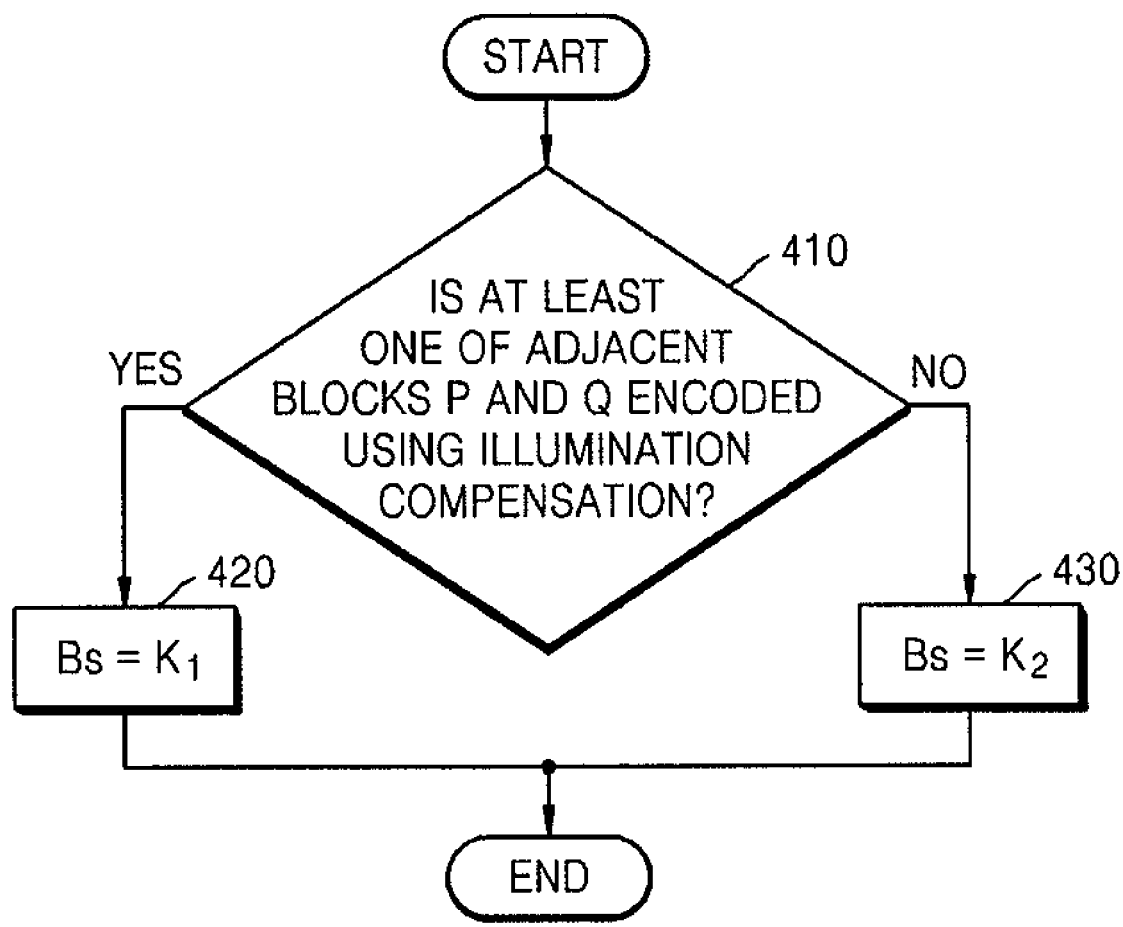
FIG. 4 is a flowchart illustrating a deblocking filtering method according to an exemplary embodiment of the present invention.
Figure 5:
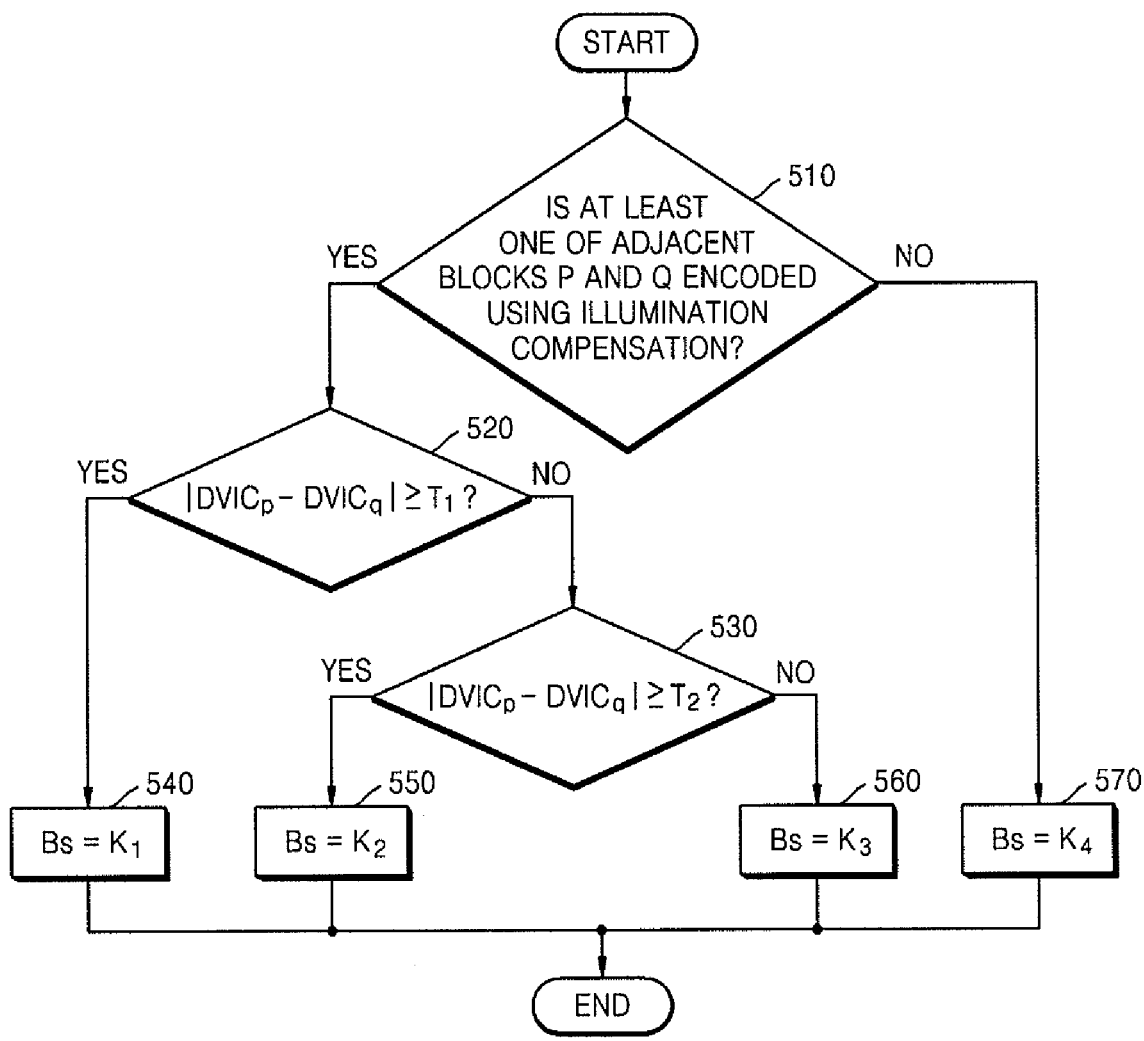
FIG. 5 is a flowchart illustrating a deblocking filtering method according to another exemplary embodiment of the present invention.
Figure 6:
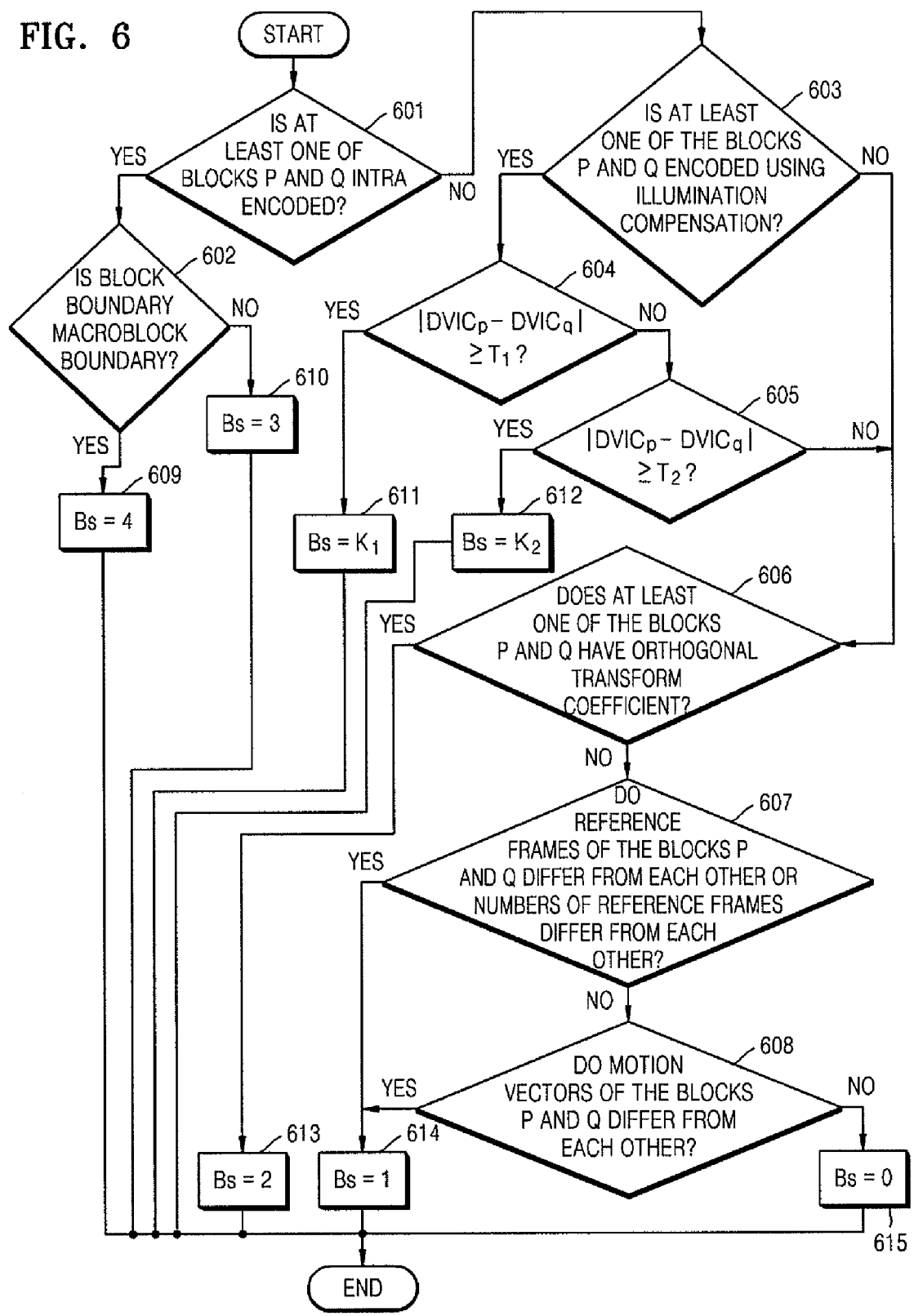
FIG. 6 is a flowchart illustrating a deblocking filtering method according to another exemplary embodiment of the present invention.

FIGS. 4 through 6 are flowcharts illustrating a deblocking filtering method according to exemplary embodiments of the present invention. The deblocking filtering method of the present exemplary embodiments is performed by the deblocking unit 324 or 336 illustrated respectively in FIGS. 3A and 3B.

Referring to FIG. 4, the deblocking unit 324 or 336 determines whether at least one of two adjacent blocks p and q that are to be deblocking filtered is encoded using illumination compensation (Operation 410).

The DC value of a restored current block can vary depending on whether at least one of two adjacent blocks p and q is encoded using illumination compensation. Thus, blocking artifacts cannot be removed according to the conventional deblocking filtering method. Therefore, the deblocking unit 324 or 336 determines whether at least one of two adjacent blocks p and q is encoded using illumination compensation in Operation 410.

The two adjacent blocks p and q may be included in different macroblocks. The illumination compensation uses the DC value macroblocks. The deblocking filtering method of the present exemplary embodiment considers whether the two adjacent blocks p and q are encoded using illumination compensation. Therefore, the two adjacent blocks p and q which are included in different macroblocks may be deblocking filtered in order to remove blocking artifacts occurred between the two adjacent blocks p and q.

If the deblocking unit 324 or 336 determines that at least one of two adjacent blocks p and q is encoded using illumination compensation in Operation 410, the deblocking unit 324 or 336 sets a filtering intensity to a boundary strength (Bs)=$K_1$, and deblocking filters the two adjacent blocks p and q (Operation 420).

If the deblocking unit 324 or 336 determines that the two adjacent blocks p and q are not encoded using illumination compensation in Operation 410, the deblocking unit 324 or 336 sets the filtering intensity to (Bs)=$K_2$, and deblocking filters the two adjacent blocks p and q (Operation 430).

$K_1$ and $K_2$ are different in order to deblocking filter the two adjacent blocks p and q based on the determination in Operation 410. If at least one of two adjacent blocks p and q is encoded using illumination compensation in Operation 410, the deblocking unit 324 or 336 may deblocking filter the two adjacent blocks p and q with the high filtering intensity in Operation 420.

If the two adjacent blocks p and q are not encoded using illumination compensation in Operation 410, the filtering intensity can be newly set according to the conventional deblocking filtering method. This will be described with reference to FIG. 6.

Referring to FIG. 5, the deblocking unit 324 or 336 determines whether at least one of two adjacent blocks p and q that are to be deblocking filtered is encoded using illumination compensation (Operation 510), which is the same as Operation 410 illustrated in FIG. 4.

If the deblocking unit 324 or 336 determines that the two adjacent blocks p and q are not encoded using illumination compensation in Operation 510, the deblocking unit 324 or 336 sets the filtering intensity to (Bs)=$K_4$, and deblocking filters the two adjacent blocks p and q (Operation 570).

If the deblocking unit 324 or 336 determines that at least one of two adjacent blocks p and q is encoded using illumination compensation in Operation 410, the deblocking unit 324 or 336 compares the absolute value of the difference between the DVIC of the block p and the DVIC of the block q with a first threshold value $T_1$ (Operation 520).

If the deblocking unit 324 or 336 determines that the absolute value is greater than or equal to the first threshold value $T_1$, the deblocking unit 324 or 336 sets the filtering intensity to (Bs)=$K_1$, and deblocking filters the two adjacent blocks p and q (Operation 540).

If the deblocking unit 324 or 336 determines that the absolute value is less than the first threshold value $T_1$, the deblocking unit 324 or 336 compares the absolute value with a second threshold value $T_2$ (Operation 530). The second threshold value $T_2$ is less than the first threshold value $T_1$.

If the deblocking unit 324 or 336 determines that the absolute value is less than the first threshold value $T_1$, the deblocking unit 324 or 336 can deblocking filter the two adjacent blocks p and q with a different filtering intensity from $K_1$ without comparing the absolute value with the second threshold value $T_2$. In this case, Operations 530, 550, and 560 are skipped, and the deblocking unit 324 or 336 can deblocking filter the two adjacent blocks p and q with the filtering intensity (Bs)=$K_4$ (Operation 570).

If the deblocking unit 324 or 336 determines that the absolute value is greater than the second threshold value $T_2$ in Operation 530, i.e. if the absolute value is between the first threshold value $T_1$ and the second threshold value $T_2$, the deblocking unit 324 or 336 sets the filtering intensity to (Bs)=$K_2$, and deblocking filters the two adjacent blocks p and q (Operation 550).

If the deblocking unit 324 or 336 determines that the absolute value is less than the second threshold value $T_2$ in Operation 530, the deblocking unit 324 or 336 sets the filtering intensity to (Bs)=$K_3$, and deblocking filters the two adjacent blocks p and q (Operation 560).

In Operations 540 and 550, the deblocking unit 324 or 336 can set the filtering intensity to different values $K_1$ and $K_2$, and deblocking filter the two adjacent blocks p and q. However, in Operations 560 and 570, the deblocking unit 324 or 336 can set the filtering intensity according to the conventional deblocking filtering method without setting $K_3$ and $K_4$. This will be described with reference to FIG. 6.

When the deblocking unit 324 or 336 compares the absolute value with the first threshold value $T_1$ and the second threshold value $T_2$ in Operations 520 and 530, if only one of two adjacent blocks p and q is encoded using illumination compensation, the deblocking unit 324 or 336 sets the DVIC of a block that is not illumination compensated to 0. For example, if the block p is encoded using illumination compensation, the deblocking unit 324 or 336 sets DVIC$_q$=0 and compares the absolute value with the first threshold value $T_1$ and the second threshold value $T_2$.

Referring to FIG. 6, the deblocking filtering method of the present exemplary embodiment comprising Operations 603 through 605 is applied to the conventional deblocking filtering method, i.e. a deblocking filtering method defined by the H.264 standards.

Figure 1A:
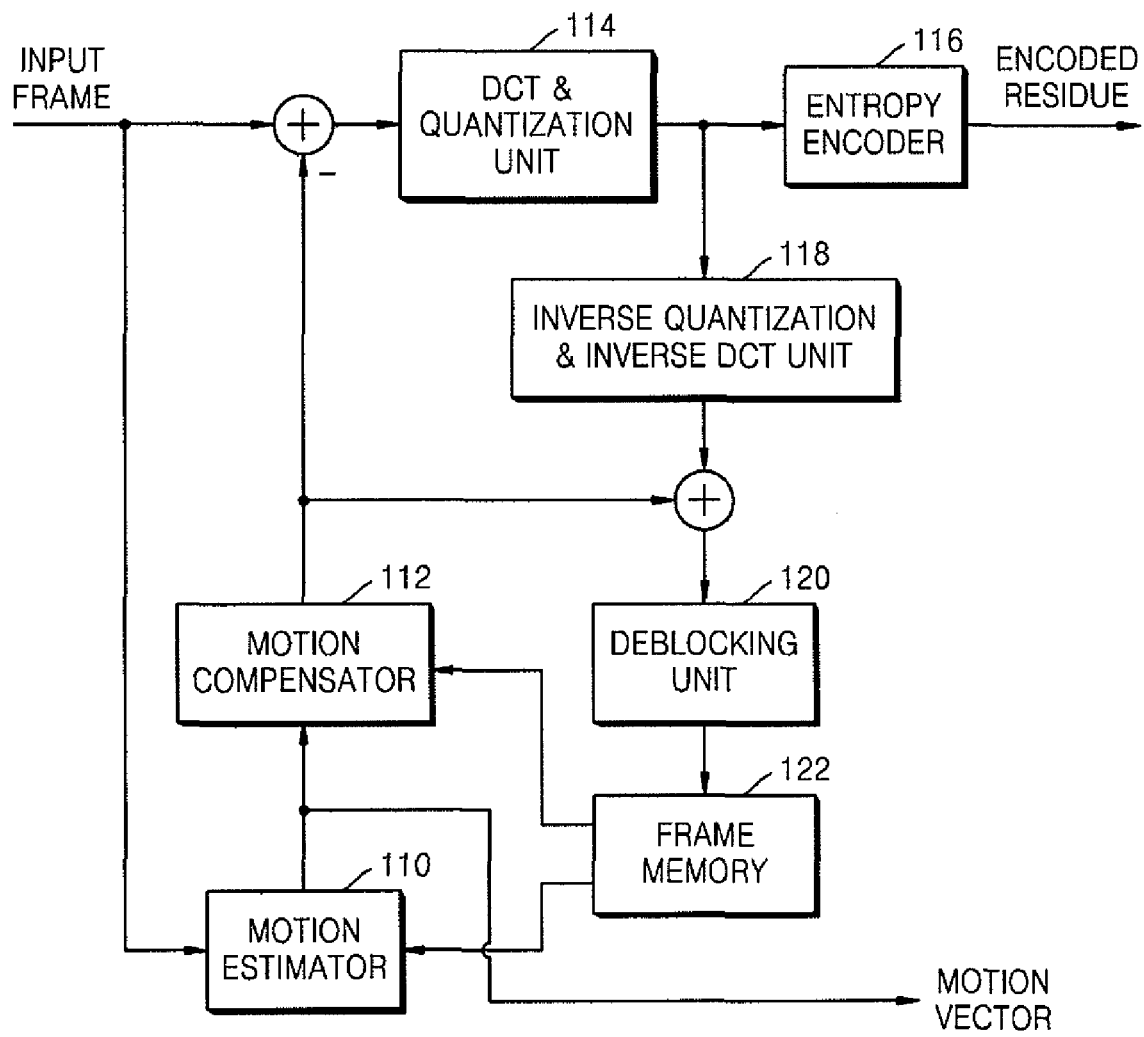
FIGS. 1A and 1B are block diagrams of conventional image encoding and decoding apparatuses, respectively.
Figure 1B:
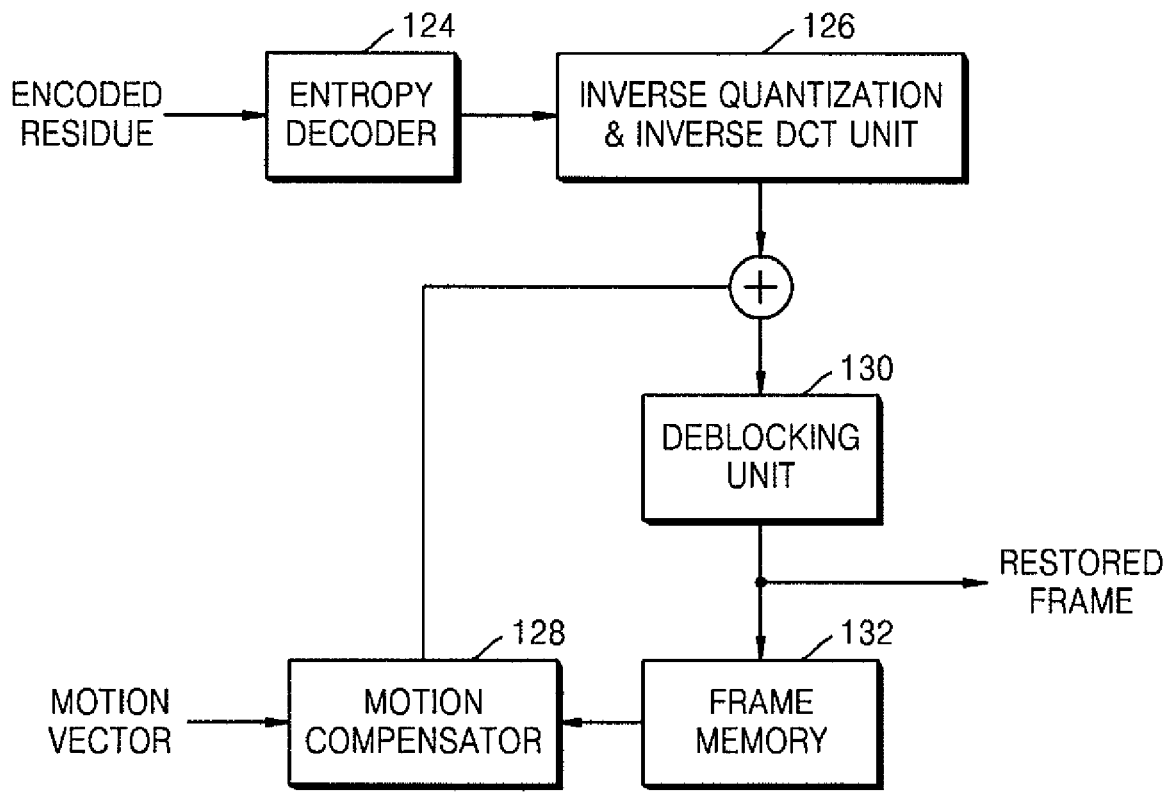
Figure 2:
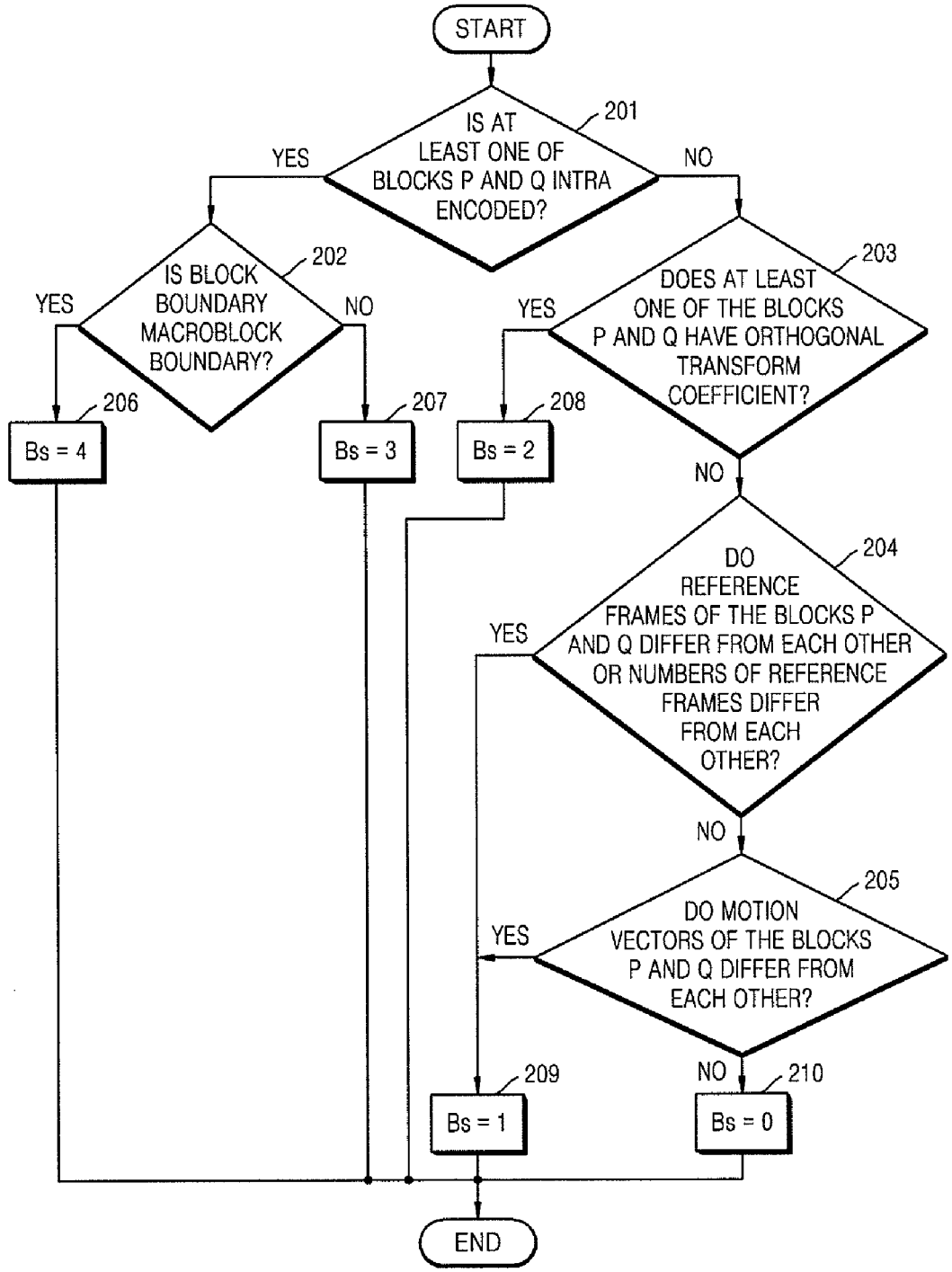
FIG. 2 is a flowchart illustrating a conventional deblocking filtering method.

The deblocking unit 324 or 336 determines whether at least one of two adjacent blocks p and q is intra encoded (Operation 601), which corresponds to Operation 201 illustrated in FIG. 2.

If the deblocking unit 324 or 336 determines that at least one of two adjacent blocks p and q is intra encoded in Operation 601, the deblocking unit 324 or 336 determines whether the boundary between the two adjacent blocks p and q is a macroblock boundary (Operation 602). According to the determination in Operation 602, the deblocking unit 324 or 336 deblocking filters the two adjacent blocks p and q with different filtering intensities in Operations 609 and 610.

If the deblocking unit 324 or 336 determines that the two adjacent blocks p and q are not intra encoded in Operation 601, the deblocking unit 324 or 336 determines whether at least one of the two adjacent blocks p and q is encoded using illumination compensation (Operation 603).

If the deblocking unit 324 or 336 determines that the two adjacent blocks p and q are not encoded using illumination compensation in Operation 603, the deblocking unit 324 or 336 adjusts the filtering intensity (Operations 606 through 608) in the same manner as the conventional deblocking filtering method.

If the deblocking unit 324 or 336 determines that at least one of the two adjacent blocks p and q is encoded using illumination compensation in Operation 603, the deblocking unit 324 or 336 compares the absolute value of the difference between the DVIC of the adjacent p and q blocks with threshold values (Operations 604 and 605).

If the deblocking unit 324 or 336 determines that the absolute value is greater than the first threshold value $T_1$ in Operation 604, the deblocking unit 324 or 336 sets the filtering intensity to (Bs)=$K_1$, and deblocking filters the two adjacent blocks p and q (Operation 611). If the deblocking unit 324 or 336 determines that the absolute value is between the first threshold value $T_1$ and a second threshold value $T_2$ that is less than the first threshold value $T_1$ in operation 605, the deblocking unit 324 or 336 sets the filtering intensity to (Bs)=$K_2$, and deblocking filters the two adjacent blocks p and q (Operation 612).

If the deblocking unit 324 or 336 determines that the absolute value is less than both the first threshold value $T_1$ and the second threshold value $T_2$, the deblocking unit 324 or 336 adjusts the filtering intensity according to the conventional deblocking filtering method. That is, Operations 203 through 205 illustrated in FIG. 2 are performed in Operation 606 through 608.

As described with reference to FIG. 5, when the deblocking unit 324 or 336 compares the absolute value with the first threshold value $T_1$ and the second threshold value $T_2$ in Operations 604 and 605, if only one of two adjacent blocks p and q is encoded using illumination compensation, the deblocking unit 324 or 336 sets the DVIC of a block that is not illumination compensated to 0. For example, if the block p is only encoded using illumination compensation, the deblocking unit 324 or 336 sets DVIC$_q$=0 and compares the absolute value with the first threshold value $T_1$ and the second threshold value $T_2$ accordingly.

The deblocking filtering method illustrated in FIG. 6 is an example of a combination of the deblocking filtering method according to the present invention and the conventional deblocking filtering method, and it will be understood by those of ordinary skill in the art that other various combinations can be applied.

For example, Operations 603 through 605 can be performed only when the deblocking unit 324 or 336 determines that at least one of the two adjacent blocks p and q does not have an orthogonal transform coefficient (Operation 606), or when the deblocking unit 324 or 336 determines that reference frames of the two adjacent blocks p and q differ from each other or the numbers of reference frames differ from each other (Operation 607).

Operations 603 through 605 can be also performed when the deblocking unit 324 or 336 determines that motion vectors of the two adjacent blocks p and q do not differ from each other (Operation 608).

Figure 7:
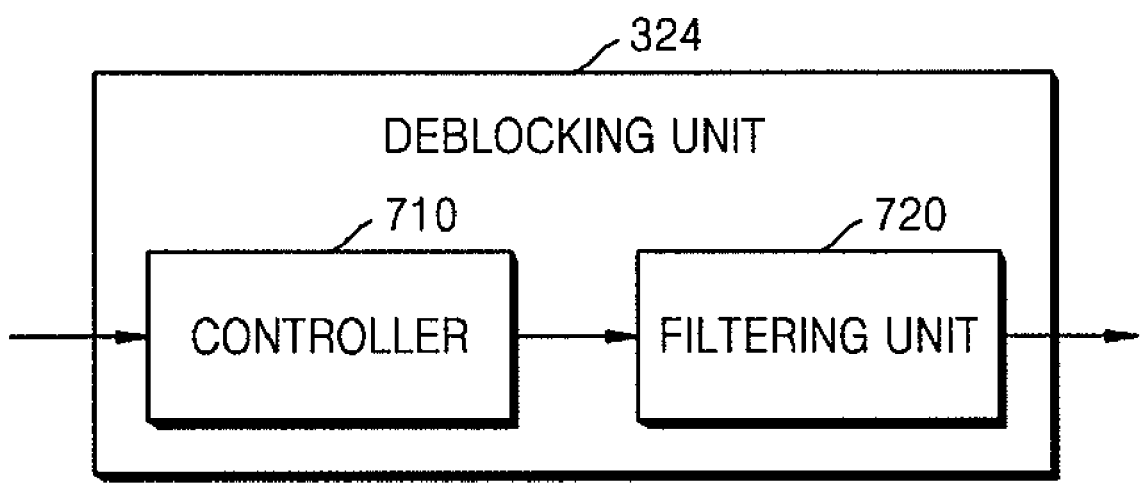
FIG. 7 is a block diagram of a deblocking unit according to an exemplary embodiment of the present invention.

FIG. 7 is a block diagram of the deblocking unit 324 or 336 according to an exemplary embodiment of the present invention. Referring to FIG. 7, the deblocking unit 324 or 336 includes a controller 710 and a filtering unit 720.

The controller 710 determines whether at least one of two adjacent blocks is encoded using illumination compensation. If the controller 710 determines that at least one of the two adjacent blocks are encoded using illumination compensation, the controller 710 may compare the absolute value of the difference of the DVICs of the two adjacent blocks with a threshold value. Two or more threshold values can be used.

If the controller 710 determines that only one of the two adjacent blocks is encoded using illumination compensation, the controller 710 may compare the absolute value of the DVIC of the block that is encoded using illumination compensation with a threshold value.

As shown in FIG. 6, the controller 710 controls a filtering intensity in the combination of the conventional deblocking filtering method and the deblocking filtering method according to an exemplary embodiment of the present invention.

The filtering unit 720 adjusts the filtering intensity based on the determination or comparison obtained by the controller 710, and deblocking filters the two adjacent blocks. The filtering intensity varies according to whether at least one of the two adjacent blocks is encoded using illumination compensation. The filtering intensity also varies according to the comparison of the absolute value of the difference of the DVICs of the two adjacent blocks with threshold values.

When the controller 710 compares the absolute value with a first threshold value $T_1$ and a second threshold value $T_2$ that is less than the first threshold value $T_1$, e.g. if the absolute value is greater than the first threshold value $T_1$, if the absolute value is between the first threshold value $T_1$ and the second threshold value $T_2$, and if the absolute value is less than the second threshold value $T_2$, the filtering unit 720 applies different filtering intensities to deblocking filter the two adjacent blocks in each of these different scenarios.

The present invention can deblocking filter blocks according to whether the blocks are encoded using illumination compensation, thereby reducing blocking artifacts.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed network coupled computer systems so that the computer readable code is stored and executed in a distributed fashion.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. An image deblocking filtering method comprising:
   determining whether at least one of two adjacent blocks is encoded using illumination compensation;
   adjusting a filtering intensity of a deblocking filter based on the determination; and
   deblocking filtering the two adjacent blocks based on the adjusted filtering intensity,
   wherein the determining comprises:
   if the two adjacent blocks is encoded using illumination compensation, comparing an absolute value of a difference between the difference value of illumination changes (DVICs) of the two adjacent blocks with a first threshold value.

2. The method of claim 1, wherein the two adjacent blocks are included in different macroblocks.

3. The method of claim 1, wherein the deblocking filtering of the two adjacent blocks comprises:
   applying different filtering intensities depending on whether the absolute value is greater or less than the first threshold value.

4. The method of claim 1, wherein if the absolute value is less than the first threshold value, comparing the absolute value with a second threshold value that is less than the first threshold value.

5. The method of claim 4, wherein the deblocking filtering of the two adjacent blocks further comprises:
   applying different filtering intensities depending on whether the absolute value is greater or less than the second threshold value.

6. The method of claim 1, wherein the determining further comprises:
   if only one of the two adjacent blocks is encoded using illumination compensation, comparing the absolute value of the difference value of illumination change (DVIC) of the block that is encoded using illumination compensation with a first threshold value.

7. The method of claim 6, wherein the deblocking filtering of the two adjacent blocks further comprises:
   applying different filtering intensities depending on whether the absolute value of the DVIC of the block that is encoded using illumination compensation is greater or less than the first threshold value.

8. The method of claim 6, wherein if the absolute value of the DVIC of the block that is encoded using illumination compensation is less than the first threshold value, comparing the absolute value with a second threshold value that is less than the first threshold value.

9. The method of claim 8, wherein the deblocking filtering of the two adjacent blocks further comprises:
   applying different filtering intensities depending on whether the absolute value of the DVIC of the block that is encoded using illumination compensation is greater or less than the second threshold value.

10. A non-transitory computer readable recording medium storing a program for executing the method of claim 1.

11. The method of claim 1, further comprising differentiating a Discrete Cosine (DC) value of a first adjacent block of the two adjacent blocks and a DC value of a reference block, and calculating a DVIC of the first adjacent block based on a first differentiating result, and
   differentiating a DC value of a second adjacent block of the two adjacent blocks and the DC value of the reference block, and calculating a DVIC of the second adjacent block based on a second differentiating result.

12. An image deblocking filtering apparatus comprising:
   a controller which determines whether at least one of two adjacent blocks is encoded using illumination compensation; and
   a filtering unit which adjusts a filtering intensity of a deblocking filter based on the determination by the controller and deblocking filtering the two adjacent blocks based on the adjusted filtering intensity, wherein if the two adjacent blocks are encoded using illumination compensation, the controller compares an absolute value of a difference between the difference value of illumination changes (DVICs) of the two adjacent blocks with a first threshold value and a second threshold value that is less than the first threshold.

13. The apparatus of claim 12, wherein the two adjacent blocks are included in different macroblocks.

14. The apparatus of claim 12, wherein the filtering unit applies different filtering intensities depending on whether the absolute value is greater than the first threshold value, is between the first threshold value and the second threshold value, or is smaller than the second threshold value, and deblocking filters the image based on the applied filtering intensity.

15. The apparatus of claim 12, wherein if only one of the two adjacent blocks is encoded using illumination compensation, the controller compares the absolute value of the difference value of illumination change (DVIC) of the block that is encoded using illumination compensation with a first threshold value and a second threshold value that is less than the first threshold value.

16. The apparatus of claim 15, wherein the filtering unit applies different filtering intensities depending on whether the absolute value of the DVIC of the block that is encoded using illumination compensation is greater than the first threshold value, is between the first threshold value and the second threshold value, or is smaller than the second threshold value, and deblocking filters the image based on the applied filtering intensity.

* * * * *